US008866739B2

(12) United States Patent
Tsuboi et al.

(10) Patent No.: US 8,866,739 B2
(45) Date of Patent: Oct. 21, 2014

(54) DISPLAY DEVICE, IMAGE DISPLAY SYSTEM, AND IMAGE DISPLAY METHOD

(75) Inventors: Masashi Tsuboi, Tokyo (JP); Shinji Kimura, Tokyo (JP); Masaaki Fukumoto, Tokyo (JP); Tsutomu Horikoshi, Tokyo (JP); Takayuki Tamura, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 224 days.

(21) Appl. No.: 13/180,760

(22) Filed: Jul. 12, 2011

(65) Prior Publication Data
US 2012/0013530 A1    Jan. 19, 2012

(30) Foreign Application Priority Data

Jul. 16, 2010    (JP) ................................ 2010-162160

(51) Int. Cl.
| G06F 3/033 | (2013.01) |
| G09G 5/08 | (2006.01) |
| G09G 5/00 | (2006.01) |
| G06F 3/048 | (2013.01) |
| H04N 13/04 | (2006.01) |
| G02B 27/22 | (2006.01) |
| G06F 3/0484 | (2013.01) |
| G06F 3/01 | (2006.01) |
| G06F 3/0346 | (2013.01) |
| G06F 3/0481 | (2013.01) |
| G06F 3/0354 | (2013.01) |
| G06F 3/03 | (2006.01) |

(52) U.S. Cl.
CPC .......... *G06F 3/0346* (2013.01); *G02B 27/2264* (2013.01); *G06F 3/04845* (2013.01); *G06F 3/016* (2013.01); *G06F 3/04815* (2013.01); *G06F 3/03545* (2013.01); *G06F 3/0325* (2013.01); *G02B 27/2214* (2013.01)
USPC .............. 345/157; 345/156; 715/850; 348/51

(58) Field of Classification Search
CPC .......... G09G 1/06; H04N 13/00; G06F 3/016; G06F 2203/013; G06F 2203/014
USPC .................................................. 345/173, 179
See application file for complete search history.

(56) References Cited

U.S. PATENT DOCUMENTS

2003/0156145 A1    8/2003    Hullender et al.
2003/0222977 A1*  12/2003    Yoshino ......................... 348/51
(Continued)

FOREIGN PATENT DOCUMENTS

| JP | 2002-095018 | 3/2002 |
| JP | 2003-172662 | 6/2003 |

(Continued)

OTHER PUBLICATIONS

Japanese Office Action for JP Patent Application No. 2010-162160 dated Jul. 10, 2012.

(Continued)

*Primary Examiner* — Dwayne Bost
*Assistant Examiner* — Christopher Kohlman
(74) *Attorney, Agent, or Firm* — MKG, LLC

(57) ABSTRACT

A display device includes: a display unit that displays an image on a display surface; a detection unit that detects, relative to the display surface, a position of an operation element including a magnetic member; and an external force application unit that applies an external force to the operation element via the magnetic member, by generating a magnetic field in a space faced by the display surface, according to the position of the operation element detected by the detection unit and content of the image displayed by the display unit.

12 Claims, 6 Drawing Sheets

(56) References Cited

U.S. PATENT DOCUMENTS

| 2006/0209019 | A1* | 9/2006 | Hu | 345/156 |
| 2010/0231558 | A1* | 9/2010 | Kwak | 345/179 |
| 2011/0109553 | A1 | 5/2011 | Tsao et al. | |

FOREIGN PATENT DOCUMENTS

| JP | 2004-129186 | 4/2004 |
| JP | 2004-177360 | 6/2004 |
| JP | 2005-130021 | 5/2005 |
| JP | 2007-510232 | 4/2007 |
| JP | 2008-067169 | 3/2008 |
| JP | 2008-198196 | 8/2008 |
| JP | 2008-226279 | 9/2008 |
| TW | 499657 B | 8/2002 |
| WO | 2007114225 A1 | 10/2007 |

OTHER PUBLICATIONS

Decision of Refusal issued in Japanese Patent Application No. 2010-162160 dated Feb. 19, 2013.
Office Action issued in Korean Patent Application No. 10-2011-0069881 dated Jan. 23, 2013.
European Examination Report for corresponding European Patent Application No. 11 172 827.5, dated May 16, 2013.
European Search Report for corresponding European Patent Application No. 11 172 827.5, dated Apr. 24, 2013.
First Office Action issued in corresponding CN Application No. 201110195916.3, issued Oct. 10, 2013, pp. 1-9.
Office Action issued in corresponding TW Application No. 100124216, issued Nov. 11, 2013, pp. 1-11.
"Pen de touch", International Conference on Computer Graphics and Interactive Techniques archive SIGGRAPH '09: Posters, 2009.
Wearable Haptic Display to Present Mass and Internal Dynamics of Virtual Objects, Sep. 14, 2007.

* cited by examiner

DISPLAY DEVICE, IMAGE DISPLAY SYSTEM, AND IMAGE DISPLAY METHOD

CROSS-REFERENCE TO RELATED APPLICATIONS

This application is based on and claims priority under 35 U.S.C. 119 from Japanese Patent Application No. 2010-162160, which was filed on Jul. 16, 2010.

FIELD OF THE INVENTION

The present invention relates to a display device, an image display system, and an image display method for providing a user with a sense of force or touch in accordance with a displayed image.

BACKGROUND

Devices are known for providing at least one of a sense of force and a sense of touch to a hand or a finger of a user, including a device having an operation element attached to an external member to provide an external force to the hand or finger of the user. For example, there is known a robot device to be disposed on a desk or the like, including an element to be grasped by a user (an operation element), via which a sense of force or a sense of touch is provided to the user (JP-A-2007-510232), and a device in which wires are provided to extend from a hand or a finger of a user to surrounding, fixedly-located drive sources, so that a sense of force is generated by adjustment of tension of the wires (JP-A-2003-172662).

Further, as a device in which an operation element is not attached to an external member, there is a device that generates an external force in a desired direction by changing angular rotation speeds of multiple gyro motors (JP-A-2004-177360). In addition, there is proposed a pen-like operation element equipped with markers and built-in motors to generate a force in accordance with a position of the pen detected by a camera, whereby a user holding the pen can experience a sensation of touching an image (Sho Kamuro, Kouta Minamizawa, Naoki Kawakami, and Susumu Tachi: "Pen de Touch," International Conference on Computer Graphics and Interactive Techniques archive SIGGRAPH '09, Posters, 2009). Further, there is proposed a device in which two motors and a belt are attached to a finger, so that control of a direction of rotation of each motor represents a force in a direction of pressing of the finger (vertical force) and a force moving the finger sideways (shearing force), thereby to allow a user to sense a weight or an inertial mass of an object (Kouta Minamizawa, Souichiro Fukamachi, Hiroyuki Kajimoto, Naoki Kawakami, and Susumu Tachi: "Wearable Haptic Display to Present Mass and Internal Dynamics of Virtual Objects," Transactions of the Virtual Reality Society of Japan, Vol. 13, No. 1, 2008-03).

As described above, various techniques for providing a sense of force or a tactile sensation to a user in accordance with input operations have been proposed. Particularly, application of such techniques to a field of virtual reality or the like to provide a user with a sensation that emulates actual physical contact with an image displayed on a display unit is expected.

SUMMARY

However, in a case where a part of an operation element is attached to an external member as in the technologies disclosed in JP-A-2007-510232 and JP-A-2003-172662, restrictions are imposed by connection with the operation element, and this creates a problem that a range of movement of the operation element is limited, as in the device shown in JP-A-2007-510232, or that a very complicated configuration becomes necessary, as in the technology disclosed in JP-A-2003-172662.

Though JP-A-2004-177360 and the other two prior art documents propose techniques in which an operation element to be worn or held by a user does not include a part connected to an external member, these techniques require power for operating a motor or an actuator, and a power source such as a battery is built into the user-worn or user-held operation element together with the motor or actuator.

One object of the present invention is to allow an external force to be applied to an operation element in accordance with content of an image, the operation element having a simpler configuration and a greater degree of freedom of operation as compared with a conventional operation element.

To achieve such an object, in one aspect of the present invention, there is provided a display device including: a display unit that displays an image on a display surface; a detection unit that detects, relative to the display surface, a position of an operation element including a magnetic member; and an external force application unit that applies an external force to the operation element via the magnetic member, by generating a magnetic field in a space faced by the display surface, according to the position of the operation element detected by the detection unit and content of the image displayed by the display unit.

Preferably, the detection unit includes an imaging unit that performs imaging, and detects a position of the operation element based on an image of the operation element generated by the imaging unit.

Further, preferably, the display unit synthesizes multiple images corresponding to different viewing positions, and displays a synthesized image that causes a virtual object to be viewed stereoscopically so as to appear in the space; the detection unit includes multiple imaging units having different directions of imaging, and detects the position of the operation element in the space relative to the display surface based on an image of the operation element captured by each of the multiple imaging units; and the external force application unit applies an external force to the operation element, the external force being determined on the basis of a position of the virtual object in the space and the position of the operation element detected by the detection unit.

Further, preferably, the external force application unit includes an electric charge storage unit that stores electric charge, and a coil, and generates a magnetic field from the coil by discharging electric charge stored in the electric charge storage unit to cause electric current to flow through the coil.

Further, preferably, the operation element includes a reflector that reflects electromagnetic wave or acoustic wave of a predetermined wavelength range, and the detection unit detects the position of the operation element on the basis of a reflection wave reflected by the reflector.

Further, preferably, the operation element includes a retroreflective member that reflects infrared light of a predetermined wavelength range.

Further, preferably, the detection unit detects a position of the operation element both before and after the external force application unit applies an external force, and the display unit displays an image according to a distance between the positions of the operation element detected by the detection unit and the external force applied by the external force application unit.

Further, in another aspect of the present invention, there is provided an image display system including: an operation element having a magnetic member; and a display device as described in the foregoing.

Further, in yet another aspect of the present invention, there is provided an image display method, including: displaying, by a display unit, an image on a display surface; detecting, by a detection unit, a position of an operation element including a magnetic member relative to the display surface; and applying, by an external force application unit, an external force to the operation element via the magnetic member, by generating a magnetic field in a space faced by the display surface, according to the position of the operation element and content of the image.

According to the present invention, it is possible to allow an external force to be applied to an operation element in accordance with content of an image, the operation element having a simpler configuration and a greater degree of freedom of operation as compared with a conventional operation element.

BRIEF DESCRIPTION OF THE DRAWINGS

Exemplary embodiments of the present invention will now be described in detail with reference to the following figures, wherein.

DETAILED DESCRIPTION

Figure 1:
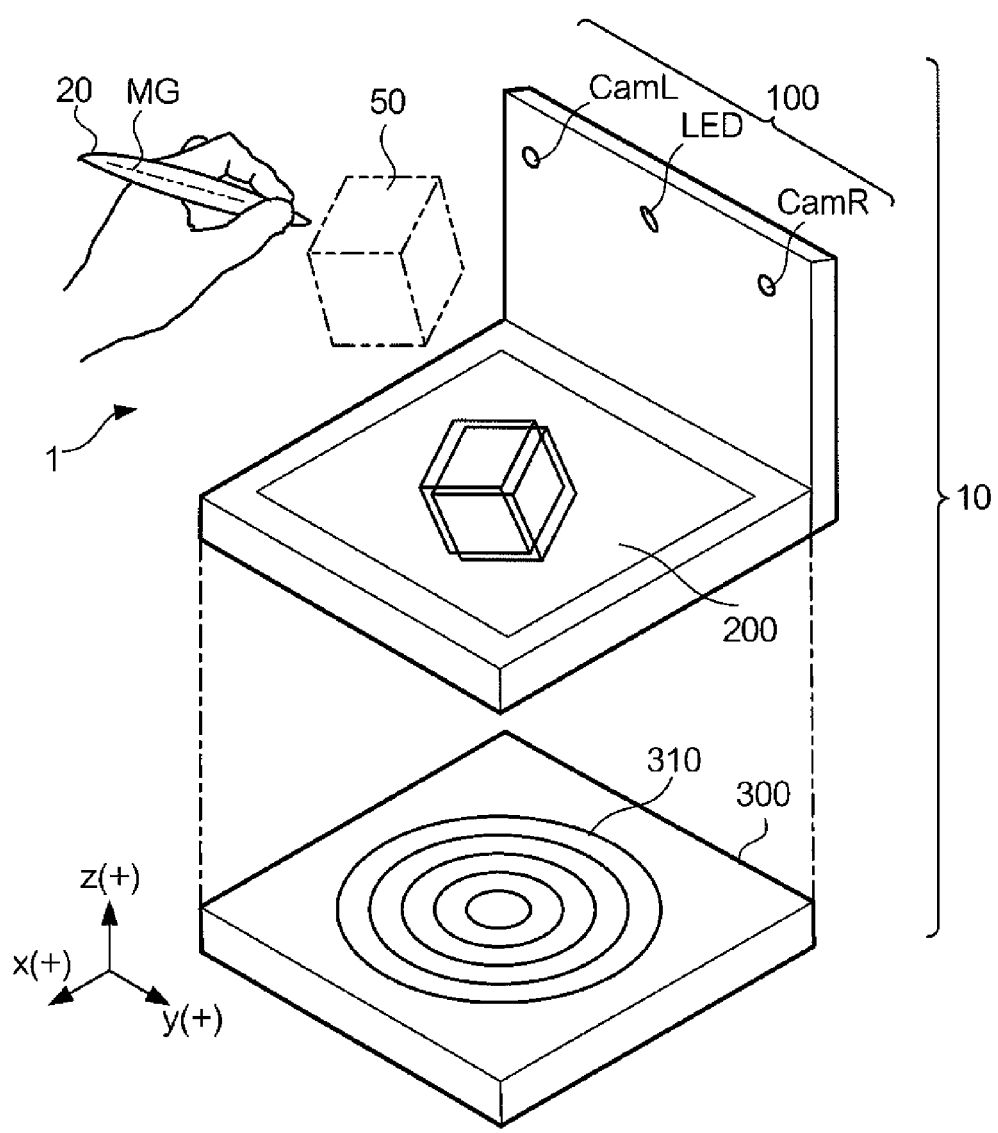
FIG. 1 is a schematic diagram showing an external view of an image display system according to an exemplary embodiment of the present invention.
Figure 2:
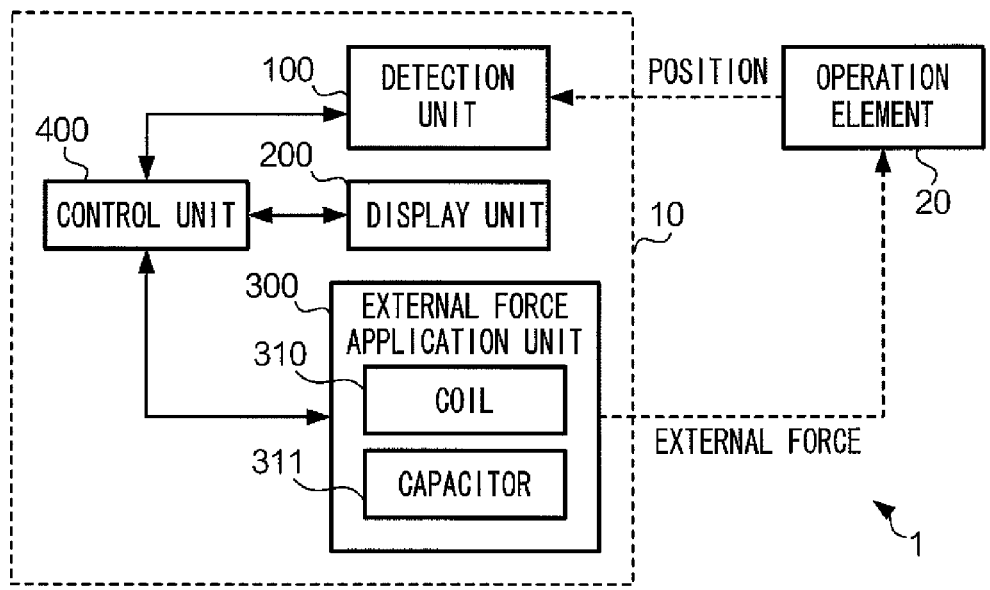
FIG. 2 is a diagram showing a configuration of an image display system.

FIG. 1 is a schematic diagram showing an external view of image display system 1 according to an exemplary embodiment of the present invention. FIG. 2 is a diagram showing a configuration of image display system 1. Image display system 1 is a system that displays images in a content, such as a movie or a game, to a user, and applies an external force to a body of the user in accordance with content represented in a displayed image, so that the user experiences a sensation as if s/he is touching the content of the image. In the following description, directions in which x, y, and z components increase will be respectively referred to as x(+) direction, y(+) direction, and z(+) direction, and directions in which x, y, and z components decrease will be respectively referred to as x(−) direction, y(−) direction, and z(−) direction.

Image display system 1 includes display device 10 and operation element 20. Operation element 20 has a shape resembling that of a pen so that a user can hold it easily, and includes only component parts that do not require power. Operation element 20 includes permanent magnet MG Since permanent magnet MG is magnetic, operation element 20 can receive an external force in accordance with a magnetic field via permanent magnet MG It is to be noted that "an external force in accordance with a magnetic field" here indicates an external field equal to or greater than a threshold value that is generated when permanent magnet MG is placed in a magnetic field having a strength equal to or larger than a prescribed strength.

Operation element 20 is not connected to an external member, and therefore, a user can move operation element 20 freely while holding the same. Further, operation element 20 is equipped with a retroreflective member serving as a marker used in detection of its position. The retroreflective member includes a combination of multiple reflection surfaces by which incident light from any direction is reflected back toward its source.

Display device 10 includes detection unit 100, display unit 100, external force application unit 300, and control unit 400. Control unit 400 includes a CPU (Central Processing Unit), a ROM (Read Only Memory), a RAM (Random Access Memory), and a storage unit, and reads out a boot loader stored in the ROM or a computer program stored in the storage unit 12 to the RAM and executes the same, thereby to control respective units of display device 10. It is to be noted that control unit 400 is contained in a housing of display device 10, and thus is not shown in FIG. 1.

Display unit 200 has a display surface including multiple pixels, for example. This display unit 200 is a multiview-type autostereoscopic display constituted of a liquid crystal display and a lenticular lens. Upon instructions from control unit 400, display unit 200 synthesizes multiple images corresponding to different viewing positions, and displays a synthesized image on the display surface. Owing to the lenticular lens, the light constituting each of the multiple images is caused to travel in a direction different from that in which light constituting another of these images travels, and as a result, an object represented by these images (hereinafter, "a virtual object") is perceived by a user as a 3-D object disposed in a space. Namely, display unit 200 serves as a display means for synthesizing multiple images corresponding to different viewing positions, and displaying a synthesized image that causes a virtual object to be viewed stereoscopically so as to appear in a space.

For example, in a case where it is assumed that display unit 200 includes a display surface having a normal in z(+) direction in a space represented by x, y, and z axes, as shown in FIG. 1, when display unit 200 displays an image obtained by synthesizing of multiple images corresponding to different viewing positions, light corresponding to each of these multiple images is emitted to a space on a z(+) direction side of the display surface. The space to which light corresponding to an image displayed on the display surface is emitted will be referred to as "a space faced by the display surface." Due to binocular disparity, a user who views the display surface will perceive that virtual object 50 is present in the space at a position indicated by broken lines.

Detection unit 100 detects a position of operation element 20 relative to the display surface of display unit 200. As is described in the foregoing, operation element 20 is constituted of only members that do not require power, and thus, detection unit 100 is equipped with an optical imaging device (imaging means), such as a camera, to perform imaging of operation element 20. Then, control unit 400 detects the position of operation element 20 on the basis of images of operation element 20 generated by the imaging device. Specifically, detection unit 100 includes a pair of optical imaging devices CamR and CamL, each detecting infrared light traveling from the space faced by the display surface, and an LED (Light Emitting Diode) for emitting infrared light to a predetermined region of the space faced by the display surface. If operation element 20 is present in the predetermined region, the emitted infrared light is reflected by a marker, such as a retroreflective member, provided on operation element 20.

The reflected infrared light is detected by the pair of optical imaging devices CamR and CamL, which generate images of infrared reflection light indicating a position and a shape of operation element 20. Based on these images, control unit 400 detects the position of operation element 20 relative to display device 10. It is to be noted that the pair of optical imaging devices CamR and CamL perform imaging of operation element 20 from different imaging directions. Since optical imaging devices CamR and CamL are located at predetermined positions relative to the display surface of display unit 200, detection unit 100 serves to detect the position of operation element 20 relative to the display surface of display unit 200.

As is described in the foregoing, detection unit 100 includes a pair of optical imaging devices, and thus, by performing so-called triangulation, can detect the position of operation element 20 along each of the three coordinate axes, namely, not only in vertical and horizontal dimensions, but also in depth. Thus, detection unit 100 detects the position of operation element 20 in a three-dimensional space.

External force application unit 300 includes capacitor 311 (electric charge-storing means) for storing electric charge and coil 310 in an interior of a board-like housing. As shown in FIG. 1, coil 310 is located on a side opposite to the display surface of display unit 200. That is, coil 310 is disposed such that it can generate a magnetic field that emanates from a surface of the housing facing toward "the space faced by the display surface" via the display surface of display unit 200 and normal to z(+) direction, and that passes through the display surface of display unit 200. When control unit 400 controls a switch (not shown) between coil 310 and capacitor 311 to cause electric current to flow from capacitor 311 to coil 310, coil 310 generates magnetic field lines extending from the surface of the housing, thereby to generate a magnetic field around display unit 200. The magnetic field causes an external force to be applied to operation element 20 via permanent magnet MG. For example, to cause a pen tip of operation element 20 to move away from external force application unit 300 in z(+) direction, a magnetic field is generated such that a pole of the magnetic field on a side of coil 310 facing operation element 20 is the same as a pole of permanent magnet MG, which is attached to the pen tip of operation element 20, on a side facing coil 310, thereby to generate a repellant force between permanent magnet MG and coil 310.

Figure 3:
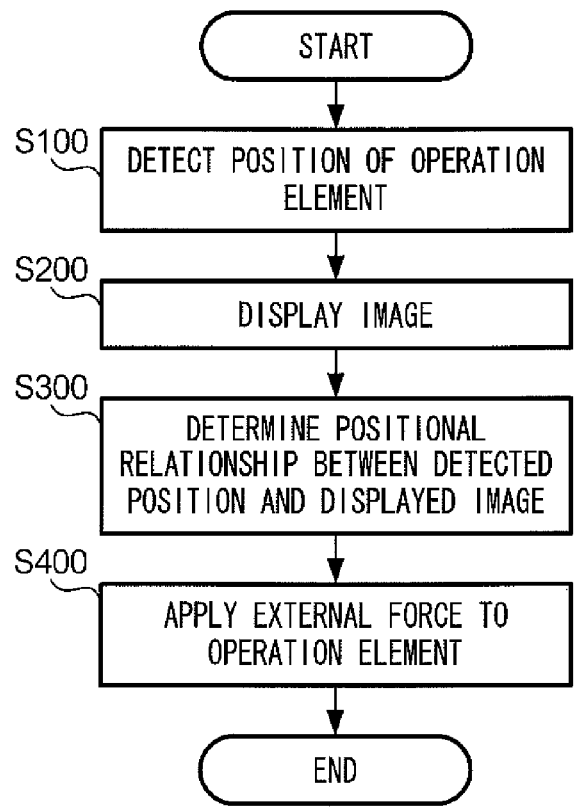
FIG. 3 is a flowchart for explaining an operation of an image display system.

FIG. 3 is a flowchart for explaining an operation of image display system 1.

Under control of control unit 400, detection unit 100 detects a position of operation element 20, and notifies control unit 400 of the detected position (step S100). Display unit 200 displays an image on its display surface under control of control unit 400 (step S200).

Control unit 400 determines the relationship between the position of operation unit 20 detected by detection unit 100 and an image displayed by display unit 200 (step S300). Specifically, control unit 400 holds data of an image displayed on the display surface, and when the image according to the data represents a virtual object perceived by a user as a 3-D object, calculates a position of the virtual object in a space (three-dimensional space). Thus, control unit 400 calculates a position of a virtual object in a space, where the virtual object is represented by an image so as to be viewed stereoscopically by a user.

Control unit 400 compares the position of operation element 20 notified from detection unit 100 and the calculated position of the virtual object in the space, and based on the comparison, determines a direction and a strength of external force to be applied to operation element 20. For example, in a case where the position of operation element 20 overlaps a position inside the virtual object, control unit 400 determines that an external force should be applied in a direction toward a position on the surface of the virtual object that is closest to the position of operation element 20, and at a strength that is proportional to a distance between these positions.

After determination of the direction and the strength of external force, control unit 400 causes external force application unit 300 to generate a magnetic field, thereby to apply an external force to operation element 20 (step S400). Specifically, under control of control unit 400, external force application unit 300 discharges electric charge stored in capacitor 311 through coil 310. As a result, a magnetic field set forth by control unit 400 is generated around coil 310, and this magnetic field acts on permanent magnet MG mounted to operation element 20, whereby an external force having the above-described direction and amplitude is applied to operation element 20. In other words, operation element 20 receives from display device 10 an external force in accordance with the position of operation element 20 and a displayed image. At this time, if a user holds or wears operation element 20, the external force received by operation element 20 is transmitted to the user, and as a result, the user perceives a reaction force as if s/he has touched an image. Namely, control unit 400 and external force application unit 300 apply an external force to operation element 20 by generating a magnetic field in accordance with the position of operation element 20 detected by detection unit 100 and content of a displayed image.

As is described in the foregoing, in an embodiment of the present invention, it is possible to provide a user with a sense of force or a tactile sensation based on an operation performed by the user and a displayed image, though an operation element held by a user is not connected to an external member and is equipped with neither a power source nor a device that needs power. Thus, a user can move the operation element to an arbitrary position in a space without physical limitation.

Also, the operation element can be made lighter than one equipped with a power source or a device that needs power. Further, by causing the display unit to display an image for presenting a 3-D image (virtual object), a three-dimensional position of the operation element in the space and a three-dimensional position of the presented virtual object can be interrelated with one another, and thus, a user can experience a sensation as if s/he is touching the virtual object.

An exemplary embodiment has been described in the foregoing. The exemplary embodiment may be modified as described below. The following modifications may be used in any combination.

In the foregoing description of the exemplary embodiment, no specific description is given of a relationship between a shape of operation element 20 and a direction of magnetic field lines extending from permanent magnet MG of operation element 20. However, permanent magnet MG may be secured on operation element 20 such that the direction of magnetic field lines coincides with a predetermined direction relative to operation element 20. For example, permanent magnet MG may generate magnetic field lines extending along a longitudinal direction of a pen-like operation element 20 in a vicinity of each magnetic pole. Specifically, permanent magnet MG may be secured on operation element 20 with its N-pole being positioned at one end of operation element 20 corresponding to a pen tip, while its S-pole is positioned at the other end or the opposite end in the longitudinal direction. It is to be noted that the positions of the N-pole and the S-pole may be reversed. In such a configuration, an external force having a specific direction determined based on the shape of operation element 20 is applied to operation element 20.

In the above-described exemplary embodiment, operation element 20 has a shape resembling a pen so that a user can hold it easily. However, it may have another shape. Also, operation element 20 may be permanent magnet MG itself. Namely, a user may simply use permanent magnet MG as operation element 20.

In the above-described exemplary embodiment, a user holds operation element 20. However, a user may wear operation element 20. For example, operation element 20 may be worn on a part of a body of a user by use of an attachment. Also, operation element 20 may be constituted of an article worn on a human body, which may be an ornament such as a nail extension, a ring, a bracelet, or the like, or clothing such as a hat, gloves, or the like.

Figure 4:
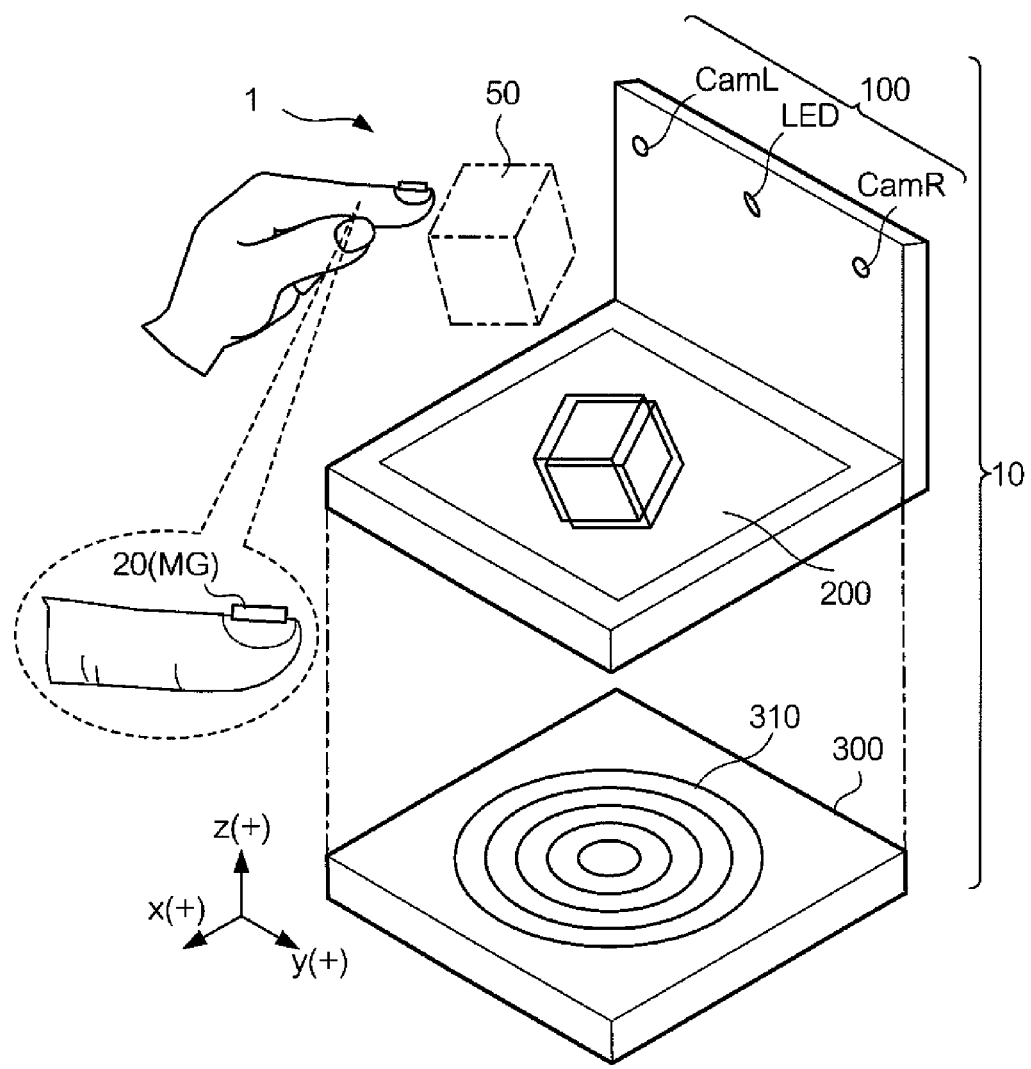
FIG. 4 is a diagram showing an example of an operation element according to a modified embodiment.

FIG. 4 is a diagram showing an example of operation element 20 according to this modification. As shown in FIG. 4, for example, operation element 20 is attached to a fingernail of a user in a manner similar to that in which a nail extension is attached to a fingernail. Since this operation element 20 is attached to a fingernail rather than to a ball of a finger, operation element 20 does not interfere when a user tries to grasp an object with fingers, and therefore, may be worn by a user without hindering daily activities. Thus, in this exemplary embodiment, a user can perform operations by pointing a finger and receive a reaction force, without a sensation that s/he is wearing a special device.

In the above-described exemplary embodiment, operation element 20 includes permanent magnet MG as a magnetic member. However, the magnetic member included in operation element 20 is not limited to permanent magnet MG For example, the magnetic member may be another magnetic member having a lower coercive force than that of permanent magnet MG Specifically, the magnetic member may be made of a ferromagnetic material such as iron, cobalt, or the like, or a ferrimagnetic material such as magnetite. Namely, it is only required that operation element 20 include a magnetic member as a member to which an external force that accords with a magnetic field is applied, and be constructed such that operation element 20 can receive, via the magnetic member, an external force that accords with a magnetic field.

In the above-described exemplary embodiment, operation element 20 includes a retroreflective member as a marker. However, instead of a retroreflective member, the marker may be a reflective member that diffuse-reflects incident light. This is because it is possible to receive reflection of incident light even in a case of diffuse reflection, though total internal reflection of incident light would improve precision of position detection.

In the above-described exemplary embodiment, a number of markers included in operation element 20 is not specifically mentioned. Operation element 20 may include multiple markers. Also, there may be multiple kinds of marker included in operation element 20. For example, in a case where permanent magnet MG is used as a magnetic member, a position of each magnetic pole of this permanent magnet MG is important because it affects an external force applied to operation element 20. Thus, in such a case, permanent magnet MG included in operation element 20 may have a marker that reflects infrared light attached on the N-pole, and a marker that reflects visible light attached on the S-pole. Detection unit 100 individually detects the position of each magnetic pole of permanent magnet MG included in operation element 20, and control unit 400 controls the direction of magnetic field generated by external force application unit 300 based on the detected position of each magnetic pole.

In the above-described exemplary embodiment, detection unit 100 includes a pair of optical imaging devices. However, detection unit 100 may include only one optical imaging device. In this case, if an angle of view of the optical imaging device is predetermined, a position of operation element 20 relative to the display surface of display unit 200 can be determined by control unit 400 based on a position of operation element 20 in an image captured by the optical imaging device, and a focal length that indicates a distance from a position at which the optical imaging device is mounted to operation element 20.

In the above-described exemplary embodiment, detection unit 100 emits infrared light by use of an LED to a predetermined region, and detects reflection light from operation element 20. However, the detection may be performed using electromagnetic wave other than infrared light. For example, an optical imaging device included in detection unit 100 may perform imaging by detecting visible light. In this way, detection unit 100 can detect a position of operation element 20 when visible light is emitted. In such a case, a device for emitting infrared light can be omitted.

In the above-described exemplary embodiment, detection unit 100 includes an LED for emitting infrared light and an optical imaging device that detects infrared light. However, use of electromagnetic wave such as light may not be necessary to detect a position of operation element 20. For example, detection unit 100 may detect a position of operation element 20 by emitting sound waves such as ultrasound waves. In such a case, operation element 20 may include a reflection member that reflects sound waves such as ultrasound waves emitted from detection unit 100. Namely, it is only required that an operation element include a reflection member that reflects a wave having a predetermined wavelength range, and a detection means detect a position of the operation element based on the wave reflected by the reflection member.

In the above-described exemplary embodiment, display unit 200 is constituted of a liquid crystal display and a lenticular lens. However, the present invention is not limited to such a configuration. For example, display unit 200 may be constituted of a display that can hold images without using electric power, such as a cholesteric liquid crystal display.

In the above-described exemplary embodiment, display unit 200 is an autostereoscopic display. However, display unit 200 may be adapted to display two-dimensional images. In such a case, it is not possible to provide a user with a sensation as if s/he is touching an image depending on a three-dimensional position of operation element 20. However, when an input device, such as a touch panel, that by itself cannot provide a user with a feedback of force in response to an input operation is used, it is possible to provide a user with a feedback of force in response to an operation by the user such as pressing of a switch displayed on a screen.

In the above-described exemplary embodiment, display unit 200 is a multiview-type autostereoscopic display constituted of a liquid crystal display and a lenticular lens. However, display unit 200 may be embodied as a stereoscopic display that can display stereoscopic images when a user wears eyeglasses using a liquid crystal shutter or the like, or another stereoscopic display that uses parallax barrier or a lens array, instead of a lenticular lens, to display stereoscopic images.

Also, display unit 200 may be a projector that projects light representing an image to a screen that may be constituted of a white cloth, for example. In such a case, the display surface of display unit 200 is provided by a screen on which images are projected. For example, in a case where display unit 200 is embodied as a TFT (Thin Film Transistor) liquid crystal display, a magnetic field generated by external force application unit 300 may influence operation of display unit 200. In contrast, when display unit 200 is constituted of a projector and a projection screen is used for providing a display surface, display unit 200 may be placed distant from external force application unit 300, so that influence of a magnetic field generated by external force application unit 300 on display unit 200 is reduced as compared to a case where display unit 200 includes an integral display surface.

In the above-described exemplary embodiment, external force application unit 300 includes a capacitor (electric charge-storing means) for storing electric charge and coil 310. However, a power source for causing electric current to flow through coil 310 is not limited to a capacitor, and many other power sources may be used.

In the above-described exemplary embodiment, a number of capacitors of external force application unit 300 is not specifically mentioned. External force application unit 300 may include multiple capacitors. In a case where multiple capacitors are provided, it is possible to charge a capacitor that has discharged, while another capacitor is discharging, and thus, a magnetic force can be generated continuously. Thus, when external force application unit 300 includes multiple capacitors, and the capacitors are caused to discharge continuously, it is possible to provide a user not only with an instantaneous force such as an impulsive force, but also with an external force producing a sensation as if s/he is being pushed by a rigid object.

In a case where multiple capacitors are used, it is possible to use capacitors having different capacitances, and to cause them to discharge selectively, thereby to vary a strength of magnetic field generated.

In addition, by reversing the direction of electric current caused to flow through coil 310 during discharge, the polarity of the magnetic field generated can be reversed. In this way, it is possible to control the direction of force applied to the operation element. That is, it is possible to selectively apply either of an external force that pushes the operation element away from external force application unit 300 or an external force that pulls the operation element toward external force application unit 300.

In the above-described exemplary embodiment, each of the display surface of display unit 200 and the surface of external force application unit 300 from which a magnetic field emanates is normal to z(+) direction. However, the normals to these surfaces do not have to be in the same direction.

Figure 5:
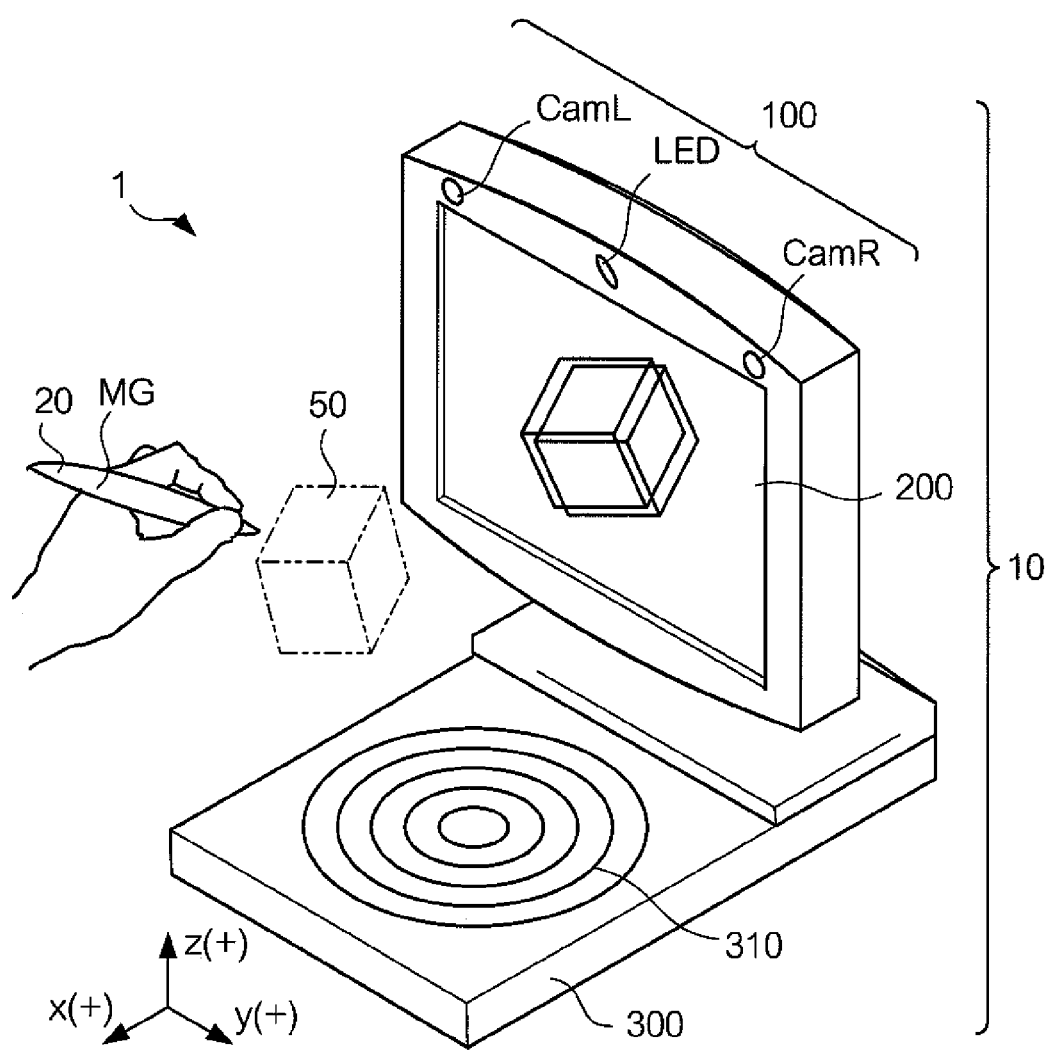
FIG. 5 is a schematic diagram showing an external view of an image display system according to a modified embodiment.

FIG. 5 is a schematic diagram showing an external view of image display system 1 according to this modification. In this modified embodiment, the display surface of display unit 200 is normal to x(+) direction, while the surface of external force application unit 300 from which a magnetic field emanates is normal to z(+) direction. In this configuration also, coil 310 of external force application unit 300 generates magnetic field lines extending toward a space faced by the display surface of display unit 300, and thus, operation element 20 present in this space is applied with an external force by external force application unit 300.

Also, external force application unit 300 may have multiple surfaces. For example, external force application unit 300 may have three pairs of opposing surfaces; namely, six surfaces having normals in x(+)/x(−) directions, y(+)/y(−) directions, and z(+)/z(−) directions, so that an external force is applied to operation element 20 according to a magnetic field generated from each of these surfaces.

In the above-described exemplary embodiment, external force application unit 300 has a single coil 310. However, multiple coils may be used such that these coils selectively generate a magnetic field. In this way, it becomes possible to generate a magnetic field at a specified position and in a specified direction.

Figure 6:
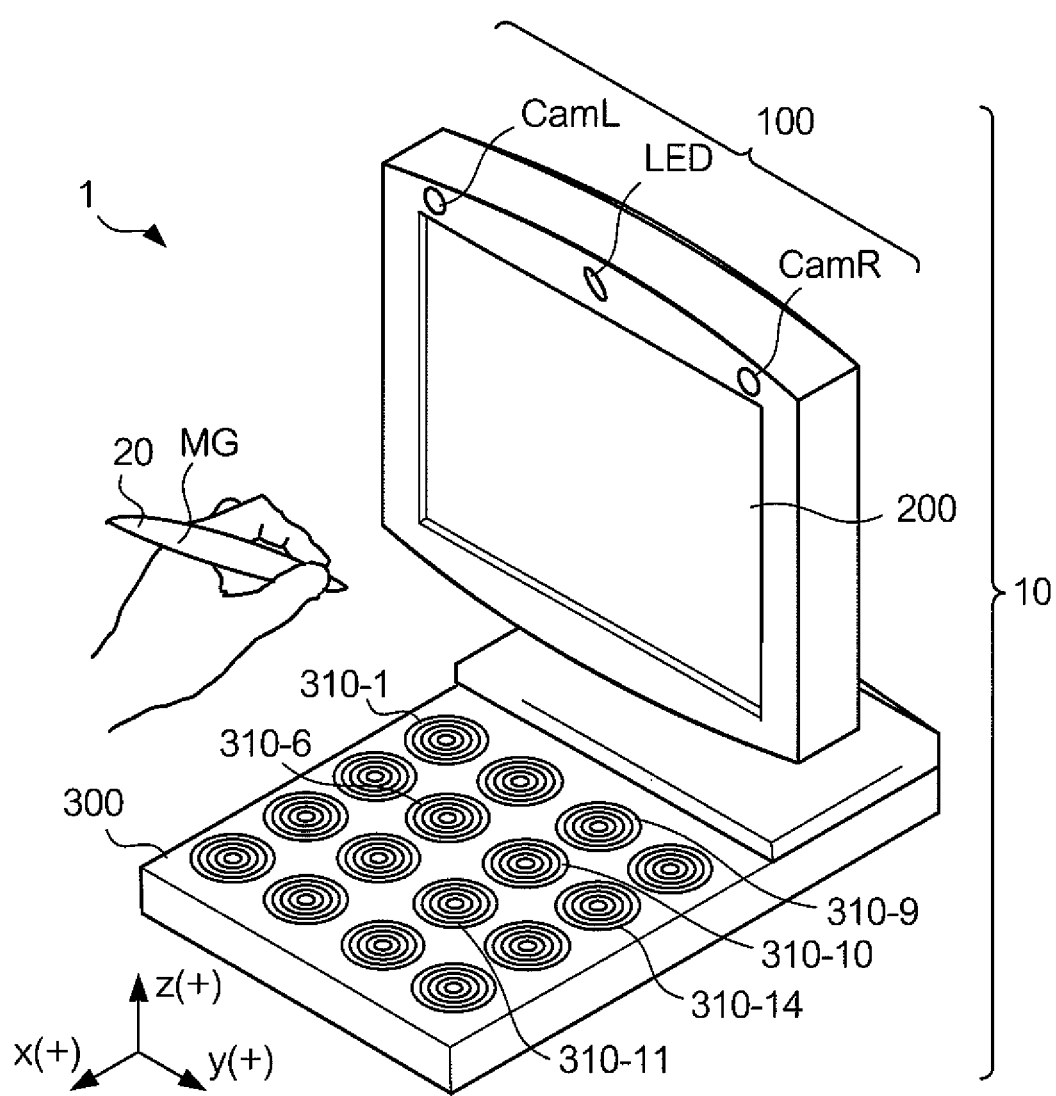
FIG. 6 is a drawing for explaining an external force application unit that uses multiple coils.

FIG. 6 is a drawing for explaining external force application unit 300 that uses multiple coils. External force application unit 300 includes sixteen coils 310 arranged in an array. On a side of coil 310-10 in x(+) direction coil 310-11 is disposed, and on a side in x(−) direction coil 310-9 is disposed. Further, a side of coil 310-10 in y(+) direction coil 310-14 is disposed, and on a side in y(−) direction coil 310-6 is disposed.

Now, it is assumed here that a user has moved operation element 20 to come close to external force application unit 300, where among coils 310, the one that is closest to the pen tip of operation element 20 is coil 310-10. Detection unit 100 detects a position of operation element 20. Then, based on the detected position of operation element 20 and content of an image displayed on the display surface of display unit 200, control unit 400 determines a direction and a strength of force to be applied to operation element 20.

For example, in a case where the above image represents a rod-like virtual object extending in z(+) direction from the position of coil 310-10, control unit 400 determines a direction and a strength of reaction force provided to operation element 20 by the virtual object. For example, if permanent magnet MG is attached to operation element 20 resembling a pen such that its N-pole is positioned at a portion corresponding to the pen tip of operation element 20, control unit 400 causes coil 310-10 to generate a magnetic field with its N-pole being on a side of coil 310-10 facing operation element 20, and, if the determined direction is x(+) direction, causes coil 310-11 to generate a magnetic field with its S-pole being on a side of coil 310-11 facing operation element 20. As a result, an external force is applied to operation element 20, urging the pen tip, at which the N-pole of permanent magnet MG is positioned, to move toward coil 310-11, which is positioned on a side of coil 310-10 in x(+) direction. Similarly, if the determined direction is x(−) direction, coil 310-9 is caused to generate a magnetic field with its S-pole being on a side of coil 310-9 facing operation element 20, if the determined direction is y(+) direction, coil 310-14 is caused to generate a magnetic field with its S-pole being on a side of coil 310-14 facing operation element 20, and if the determined direction is y(−) direction, coil 310-6 is caused to generate a magnetic field with its S-pole being on a side of coil 310-6 facing operation element 20. In this way, external force application unit 300 can apply an external force to the pen tip of operation element 20 in any direction in the x-y plane.

In the above-described exemplary embodiment, control unit 400 calculates a position of a virtual object in a space, compares the calculated position of the virtual object with a position of operation element 20 notified from detection unit 100, and based on the comparison, determines a direction and a strength of external force to be applied to operation element 20. However, in a case where detection unit 100 detects a three-dimensional position of operation element 20 while display unit 200 displays a two-dimensional image (i.e., an image that does not generate a stereoscopic image when viewed by a user), control unit 400 may project the three-dimensional position of operation element 20 onto the display surface of display unit 200, and determine a positional relationship between the thus-obtained position of operation element 20 on the display surface and the two-dimensional image.

In the above-described exemplary embodiment, control unit 400 controls external force application unit 300 such that an external force whose direction and strength are determined based on a position of operation element 20 and a position of a virtual object is applied to operation element 20. Control unit 400 may control display unit 200 to display images determined based on: a displacement of operation element 20 after application of external force by external force application unit 300; and the applied external force.

Figure 7:
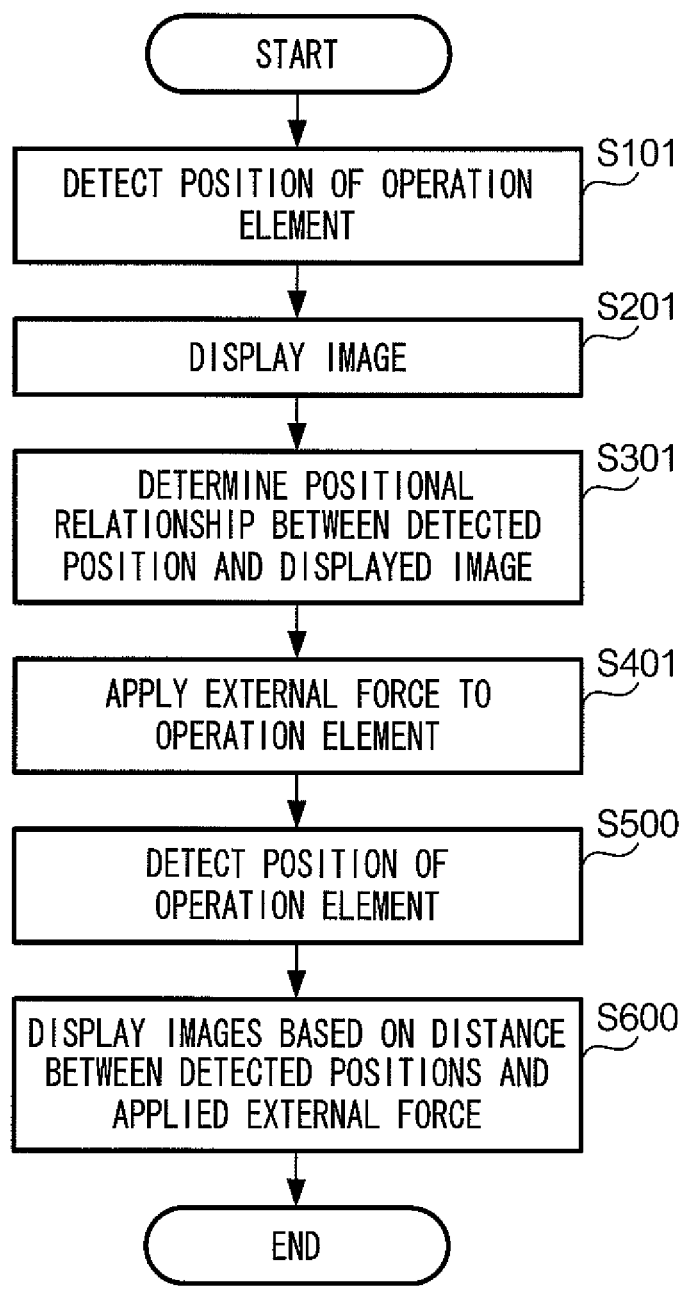
FIG. 7 is a flowchart for explaining an operation of an image display system according to a modified embodiment.

FIG. 7 is a flowchart for explaining an operation of image display system 1 according to this modification. Since steps S101-S401 are respectively the same as steps S 100-S400 in FIG. 3, explanation of these steps will be omitted. After causing external force application unit 300 to generate a magnetic field, control unit 400 acquires a position of operation element 20 detected by detection element 100 (step S500). Namely, detection unit 100 functions as a detection means that detects a position of an operation element both before and after application of an external force by an external force application means. Then, control unit 400 calculates a distance between the positions of operation element 20 before and after the generation of magnetic field by force application unit 300, and determines images based on the calculated distance and the external force applied by external force application unit 300. Thereafter, control unit 400 causes display unit 200 to display the determined images (step S600).

In the natural world, when two objects exert force against each other, these forces always have the same strength and are exerted in opposite directions. Therefore, to cause a virtual object to move to resemble movement of an object in the natural world, it is necessary that the force that the virtual object receives from operation element 20 be reflected by movement of the virtual object.

In this modification, control unit 400 predetermines mass of each of the virtual object and operation element 20. Control unit 400 calculates the force that the virtual object receives from operation element 20, based on the distance between the positions of operation element 20 before and after application of an external force by external force application unit 300 (displacement of operation element 20), an external force applied by external force application unit 300, and the predetermined mass of each of the virtual object and operation element 20. Then, control unit 400 causes display unit 200 to display images representing the virtual object moving in accordance with the force provided from operation element 20. Viewing these images, a user will sense, via operation element 20, a force emulating a reaction force from the virtual object represented in the images, and that s/he has moved the virtual object and can experience a simulated sensation of touching the virtual object.

What is claimed is:

1. A display device comprising:
    a display unit that displays an image on a display surface;
    a detection unit that detects, relative to the display surface, a position of an operation element including a magnetic member; and
    an external force application unit that applies an external force to the operation element via the magnetic member, by generating a magnetic field in a space faced by the display surface, according to the position of the operation element detected by the detection unit and content of the image displayed by the display unit, the external force application unit being arranged on a side opposite to the display surface of the display unit, the display surface emitting a light corresponding to the image,
    wherein the display unit synthesizes multiple images corresponding to different viewing positions, and displays a synthesized image that causes a virtual object to be viewed stereoscopically so as to appear in the space;
    the detection unit includes multiple imaging units having different directions of imaging, and detects the position of the operation element in the space relative to the display surface based on an image of the operation element captured by each of the multiple imaging units; and
    the external force application unit applies the external force to the operation element, the external force being determined on the basis of a comparison between a position of the virtual object in the space and the position of the operation element detected by the detection unit.

2. The display device according to claim 1, wherein the detection unit includes an imaging unit that performs imaging, and detects a position of the operation element based on an image of the operation element generated by the imaging unit.

3. The display device according to claim 1, wherein the external force application unit includes an electric charge storage unit that stores electric charge, and a coil, and generates a magnetic field from the coil by discharging electric charge stored in the electric charge storage unit to cause electric current to flow through the coil.

4. The display device according to claim 1, wherein
    the operation element includes a reflector that reflects electromagnetic wave or acoustic wave of a predetermined wavelength range, and
    the detection unit detects the position of the operation element on the basis of a reflection wave reflected by the reflector.

5. The display device according to claim 4, wherein the operation element includes a retroreflective member that reflects infrared light of a predetermined wavelength range.

6. The display device according to claim 1, wherein
    the detection unit detects a position of the operation element both before and after the external force application unit applies an external force, and
    the display unit displays an image according to a distance between the positions of the operation element detected by the detection unit and the external force applied by the external force application unit.

7. An image display system comprising:
    an operation element having a magnetic member; and
    a display device according to claim 1.

8. The display device according to claim 1, wherein the external force application unit arranged such that the magnetic field generated by the external force application unit passes through the display surface of the display unit.

9. The display device according to claim 1, wherein the space is a physical space.

10. An image display method comprising:
    displaying, by a display unit, an image on a display surface;
    detecting, by a detection unit, a position of an operation element including a magnetic member relative to the display surface;
    applying, by an external force application unit, an external force to the operation element via the magnetic member, by generating a magnetic field in a space faced by the display surface, according to the position of the operation element and content of the image, the external force application unit being arranged on a side opposite to the display surface of the display unit, the display surface emitting a light corresponding to the image; and
    synthesizing, by the display unit, multiple images corresponding to different viewing positions, and displaying a synthesized image that causes a virtual object to be viewed stereoscopically so as to appear in the space;

wherein the detection unit includes multiple imaging units having different directions of imaging, and detects the position of the operation element in the space relative to the display surface based on an image of the operation element captured by each of the multiple imaging units; and the external force application unit applies the external force to the operation element, the external force being determined on the basis of a comparison between a position of the virtual object in the space and the position of the operation element detected by the detection unit.

11. The image display method according to claim 10, wherein the external force application unit arranged such that the magnetic field generated by the external force application unit passes through the display surface of the display unit.

12. The image display method according to claim 10, wherein the space is a physical space.

* * * * *